United States Patent [19]

Locke et al.

[11] 4,406,161

[45] Sep. 27, 1983

[54] MEASUREMENT OF AIR MASS FLOW INTO AN INTERNAL COMBUSTION ENGINE

[75] Inventors: Alan W. Locke, Solihull; Peter Fitzpatrick, Redditch, both of England

[73] Assignee: Lucas Industries Limited, Birmingham, England

[21] Appl. No.: 358,110

[22] Filed: Mar. 15, 1982

[30] Foreign Application Priority Data

Apr. 1, 1981 [GB] United Kingdom ................ 8110180

[51] Int. Cl.$^3$ ............................................. G01M 15/00
[52] U.S. Cl. ................................... 73/118; 73/861.52
[58] Field of Search ................ 73/118, 861.52, 861.61, 73/861.62; 123/494; 364/424, 431, 510

[56] References Cited

U.S. PATENT DOCUMENTS 4,181,944  1/1980  Yamauchi et al. ............. 123/480 X
4,311,042  1/1982  Hosoga et al. .................. 73/118 A Primary Examiner—Jerry W. Myracle

[57] ABSTRACT

An air mass flow measuring system for measuring flow into an internal combustion engine comprises a throttle angle transducer and further transducers measuring ambient air temperature and pressure as well as the pressure drop across the throttle valve. The signals from these transducers are supplied to calculating circuit which carries out the calculation $\dot{M}=K\sqrt{P \cdot \Delta P/T}$. The values of the coefficient K used in this calculation are derived from an empirically programmed read only memory incorporated in the calculating circuit, such memory storing empirically determined values of K for each combination of a plurality of values of throttle angle and a plurality of values of $\sqrt{P \cdot \Delta P/T}$.

3 Claims, 4 Drawing Figures

MEASUREMENT OF AIR MASS FLOW INTO AN INTERNAL COMBUSTION ENGINE

This invention relates to the measurement of air mass flow into an internal combustion engine, particularly for the purpose of controlling engine fuelling and ignition timing.

In the past it has been proposed (see for example UK Pat. No. 1,321,989) to utilize a digital memory to store data relating to the engine fuelling and/or ignition timing for a plurality of different combinations of two different engine parameters, such as engine speed and throttle position or inlet manifold pressure, and memory being empirically programmed to achieve satisfactory engine running in all engine conditions. Such a system is dependent on the provision of a memory containing data matching the engine type with which it is to be used. Any minor changes in engine design are likely to require a new memory.

More recently, various attempts have been made to measure air mass flow directly, either by aerodynamic methods (e.g. by using a spring-loaded hinged flap in the air intake) or by more sophisticated methods (e.g. by hot wire anemmometry or corona discharge type mass-flow meters). These methods have not proved entirely successful as it is found that parameters other than air mass flow—e.g. pressure or humidity could affect their accuracy, giving rise to the need for complex compensating circuitry.

Other flow measuring systems, such as those described in U.S. Pat. Nos. 3,817,099; 3,818,933; 3,888,458 and 3,949,717 overcome some of the above mentioned disadvantages, by utilizing a valve in series with the throttle flap and maintaining a constant pressure differential across this valve by servo-control of the valve in response to the pressure differential signal across the valve. This system, however, is not only very complex and costly as a result of the need for a second valve of complex shaping and a servo-mechanism, but the servo-mechanism can also introduce hysteresis problems.

The present invention has for its object to provide a relatively simple air mass flow measurement system for an internal combustion engine.

An air mass flow measurement system in accordance with the invention comprises an air intake throttle position transducer and further transducers sensitive to ambient air pressure, ambient air temperature and the pressure downstream of the throttle and a calculating circuit connected to said transducers and arranged to execute the calculation $$\dot{M} = K\sqrt{\frac{P \cdot \Delta P}{T}}$$

where
 $\dot{M}$ is the air mass flow,
 K is an orifice coefficient of discharge,
 P is the ambient air pressure,
 T is the ambient air temperature, and
 $\Delta P$ is the pressure drop through the throttle,
said calculating circuit including a digital memory containing empirically determined data representing the value of K for each combination of a plurality of different values of the throttle position and a plurality of different values of one or a combination of P, $\Delta P$ and T.

Preferably, the memory data represents a value of K for each combination of a plurality of different values of the throttle position and a plurality of different values of the expression $\sqrt{P \cdot \Delta P/T}$, which is related to the Reynolds Number of flow through the throttle.

With this system, provided a standard throttle arrangement (i.e. a standard combination of throttle flap and surrounding tube) is used, the system will provide an output accurately representing air mass flow irrespective of the design, tune or wear of the engine it is used with.

The air intake throttle position transducer may be non-linearly calibrated to produce an output signal directly related to the coefficient $K_0$ (i.e. the value of K at a standard P, $\Delta P$ and T).

Alternatively the air intake throttle position transducer may be a linear transducer.

An example of the invention is illustrated in the accompanying drawings, in which.

Figure 1:
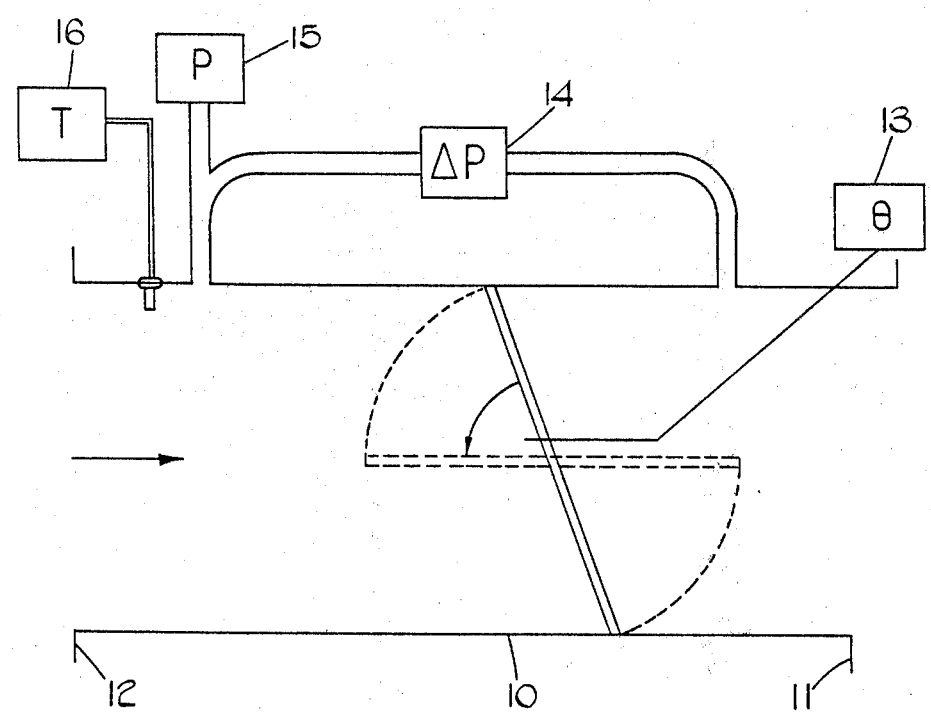
FIG. 1 is a diagrammatic view of an engine air intake with transducers for measuring various parameters.

Referring firstly to FIG. 1, the air intake includes a five inch length of tube 10 of diameter 2 inches provided at its ends with conventional means 11, 12 for mounting it between the air cleaner and the induction manifold of an engine. Four transducers, 13 to 16 are associated with the intake. Transducer 13 is a throttle butterfly angle transducer which may simply be a potentiometer on the butterfly shaft. The potentiometer 13 may be a linear potentiometer, in which case it provides a signal relating to butterfly angle, or it may be calibrated to give a direct indication of the coefficient $K_0$ referred to above. The transducer 14 is a commercially available differential presure strain gauge type transducer measuring the difference in pressure between tappings 2 inches upstream and 1 inch downstream of the butterfly spindle. The transducer 15 is another commercially available strain gauge-type transducer which is connected to measure the absolute air pressure at the upstream tapping. Transducer 16 is a commercially available NTC thermistor.

Figure 2:
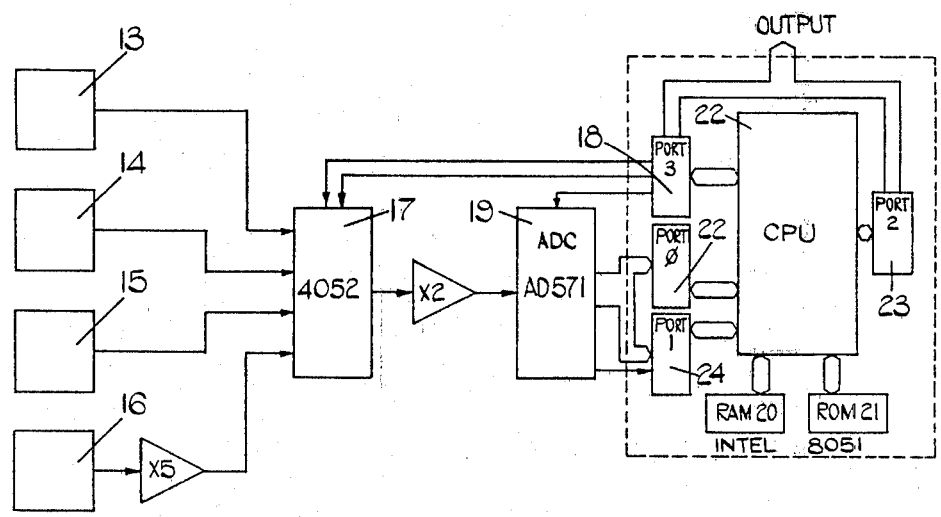
FIG. 2 is a block diagram showing the electronic circuit.

Turning now to FIG. 2 the block diagram shows the four transducers 13, 14, 15 and 16 (in the latter case by an amplifier) connected to the four inputs of a signal selector circuit 17 (an integrated circuit type 4052) controlled by two bits of the output word from one port 18 of a microcomputer. The output of the selector 17 is connected via an amplifier with a gain of 2 to the analog input of an analog-to-digital converter module 19 (an integrated circuit type AD571) also having control connections to one bit respectively of ports 18 and 24. The resultant digital signal is input to the microprocessor via ports 24 and 22, and the mass flow signal is output in digital form from ports 18 and 23. The microprocessor unit also includes RAM 20, ROM 21 and a central processor unit 22 (e.g. an INTEL 8051 microprocessor) but the remaining elements of the microcomputer are commonplace and will not be listed herein.

Figure 3:
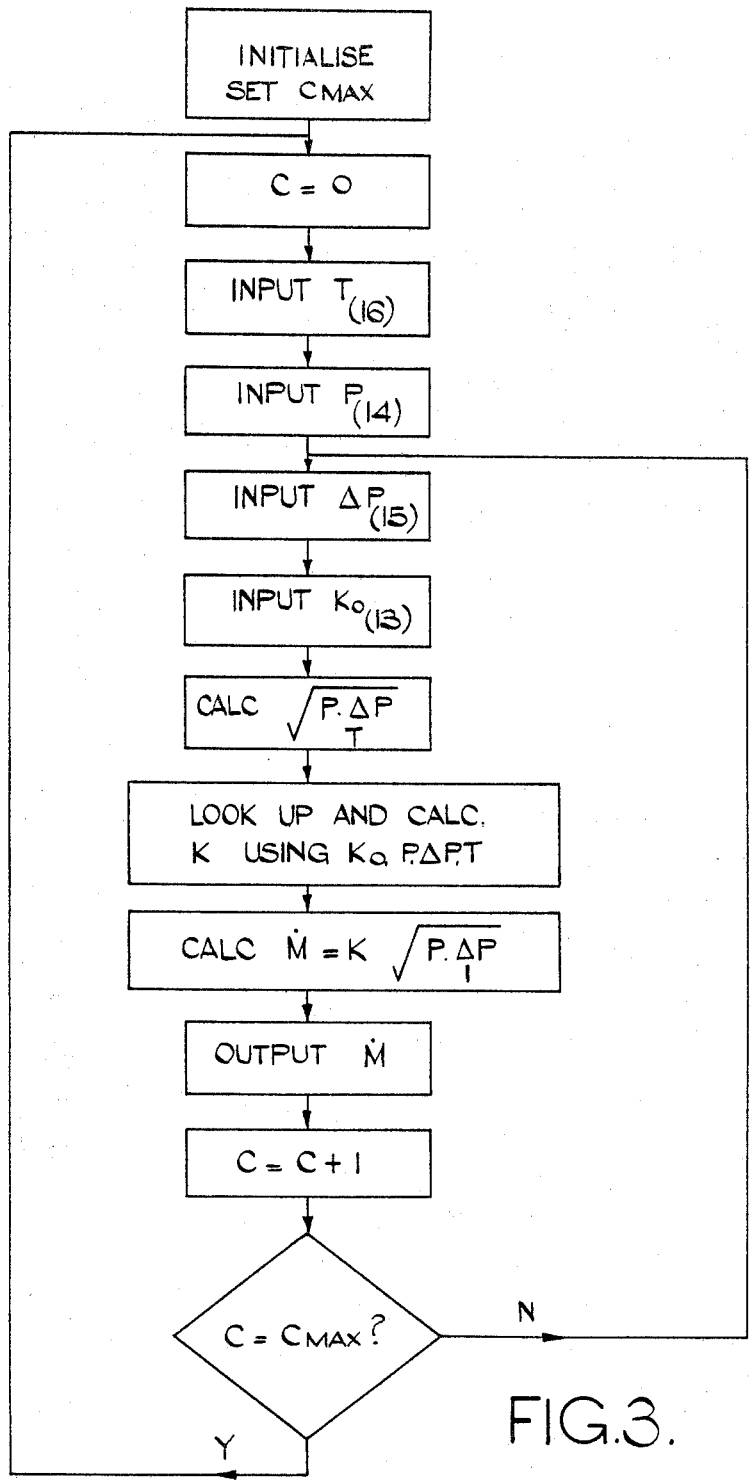
FIG. 3 is a flow chart for the program for a microcomputer used in the circuit of FIG. 2.

Turning now to FIG. 3 the programme provides for periodic sampling of the signals produced by the four transducers 13 to 16. Since ambient pressure and ambient temperature are variables which change relatively slowly as compared with the throttle angle and pressure drop the former signals are sampled less frequently than the latter. To this end the RAM includes a sampling cycle counter which determines the relative sampling frequencies.

Initially, when the sampling cycle counter content is zero (C=0), a full sampling cycle, including successive inputting of T,P,ΔP and $K_0$ is undertaken. The value of K for the existing flow conditions is then derived by looking up stored values in the ROM and the sampling cycle counter is then incremented. The value of M is now calculated and outputted following which the content of the sampling cycle counter is examined. If this content is not at a value $C_{max}$, the program returns to the input ΔP stage. If $C=C_{max}$ then the program returns to the input T stage. The effect of this is that ΔP and throttle position are sampled more frequently than P and T and, being the most likely to change quickly, are kept updated.

Where (not shown) the transducer 13 merely reads the angle of the butterfly, this angle data is inputted and, as an additional program step preceding the looking up of K(P) in the ROM, the value of $K_0$ is looked up in another ROM look-up table.

A detailed description of the program in structured English is annexed as an appendix hereto.

Figure 4:
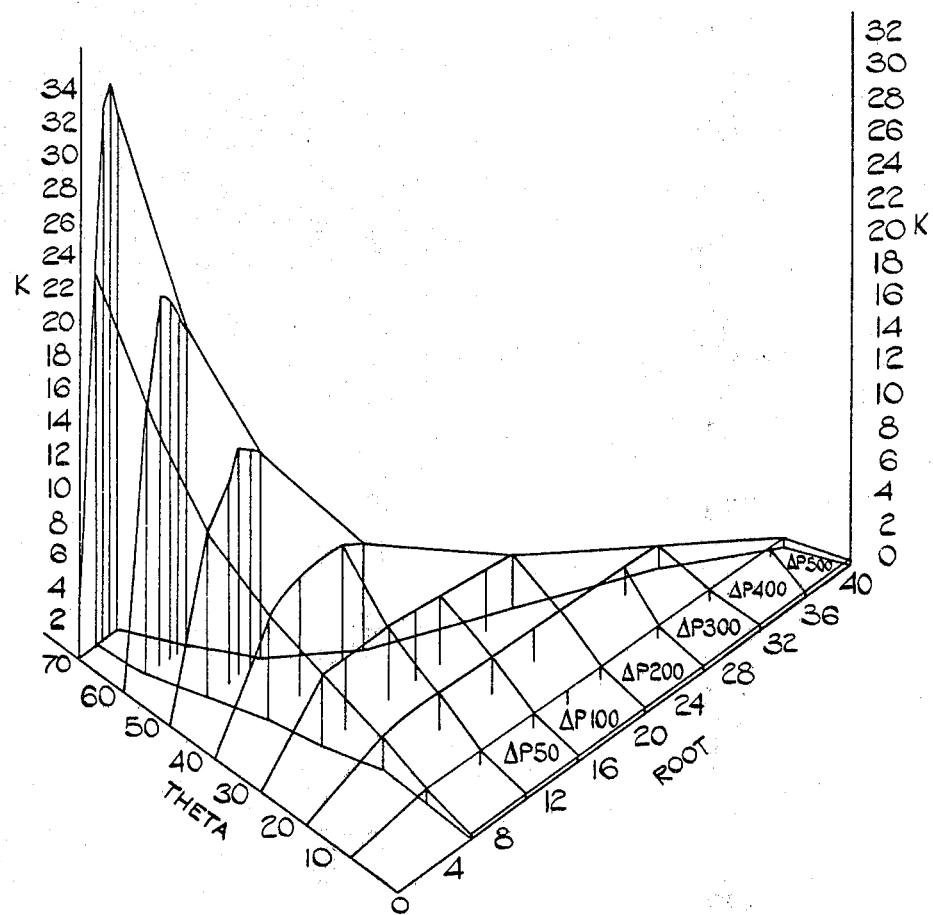
FIG. 4 is an isometric graph showing an example of the manner in which K varies with throttle angle and $\sqrt{P \Delta P/T}$.

FIG. 4 shows a typical K characteristic for a throttle valve. To derive this characteristic the tube 10 was connected in series with an accurate mass flow meter and a valve between the inlet of a vacuum pump and atmosphere. The throttle butterfly was set in turn to different angles of opening and, at each angle the actual mass flow and the corresponding values of P,ΔP and T were noted for different settings of the value. The value of K for each such setting was then calculated and plotted.

It will be noted that the values of the parameter shown as ROOT in the graph, which represents the value of $\sqrt{P \cdot \Delta P / T}$ are limited to a progressively more limited range as the throttle butterfly is opened. This is taken into account in the program described in the apendix hereto.

APPENDIX
--------

INPUT ROUTINE
-------------

```
DEFINE:             SET MPX(N)
                    PORT 3 = PORT 3 AND FNH
                    WAIT 4 MICROSECONDS

DEFINE:             BLANK AND CONVERT
                    PORT 3 = PORT 3 OR 04H
                    WAIT 3 MICROSECONDS
                    PORT 3 = PORT 3 AND FBH

BEGIN INPUT

CYCLE COUNTER = CYCLE COUNTER + 1
                    SET MPX(0)
                    BLANK AND CONVERT
IR1:                IF DATA READY = 1
                    THEN GOTO IR1 ELSE CONTINUE
                    ENDIF

THETA_L = P0
                    THETA_M = P1 AND 03H

SET MPX(1)
                    BLANK AND CONVERT
IR2:                IF DATA READY = 1
                    THEN GOTO IR2 ELSE CONTINUE
                    ENDIF
```

```
                    DELTA_P_L = P0
                    DELTA_P_M = P1 AND 03H

IF CYCLE COUNTER > 127
                    THEN CONTINUE ELSE GOTO ENDINPUT
                    ENDIF

FLAG_P_T = FFH

SET MPX(2)
                    BLANK AND CONVERT

IR3:                IF DATA READY = 1
                    THEN GOTO IR3 ELSE CONTINUE
                    ENDIF

P_L = P0
                    P_M = P1 AND 03H

SET MPX(3)
                    BLANK AND CONVERT

IR4:                IF DATA READY = 1
                    THEN GOTO IR4 ELSE CONTINUE
                    ENDIF

T_L = P0
                    T_M = P1 AND 03H

CYCLE COUNTER = 0

ENDINPUT: NOP

END INPUT

INPUT ADJUST ROUTINE
--------------------

BEGIN INPUT ADJUST

THETA = THETA - 43H
                    DELTA_P = DELTA_P - 73H

IF FLAG_P_T = 0
                    THEN GOTO INADJ1 ELSE CONTINUE
                    ENDIF

P = P + 9BH

END INPUT ADJUST
```

THERMISTOR LINEARISATION ROUTINE
----------------------------------

```
                    OFFSET = 1E0H
                    DATA POINTER = B80H

IF T_M = 0
                    THEN GOTO LOWER ELSE GOTO HIGHER
                    ENDIF

HIGHER:             BASE = (T_M) * 2 + (T_L AND 80H)/80H + 0EH
                    A = VALUE AT (BASE + DATA POINTER)
                    B = VALUE AT (BASE + 1 + DATA POINTER)
                    X = (T_L AND 7FH) * 2

GOTO MULT

LOWER:              IF T_L AND 80H <> 0
                    THEN GOTO HIGHER ELSE CONTINUE
                    ENDIF

BASE = (T_L AND F0H)/10H
                    A = VALUE AT (BASE + DATA POINTER)
                    B = VALUE AT (BASE + 1 + DATA POINTER)
                    X = (T_L AND 0FH) * 10H

MULT:               ROOT_T = A + (B - A) * X + OFFSET

FLAG_P_T = 0

INADJ1:             NOP
```

THERMISTOR LINEARISATION LOOK-UP TABLE
-----------------------------------------

```
   CONTAINS VALUES FOR ROOT(T) FOR VARIOUS VALUES OF T.

START ADDRESS = B80H
   NO. OF POINTS = 23
```

DOUBLE PRECISION MULTIPLY ROUTINE
------------------------------------

```
                    A = (P_L) * (DELTA_P_L)
                    B = (P_L) * (DELTA_P_M)
                    C = (P_M) * (DELTA_P_L)
                    D = (P_M) * (DELTA_P_M)

P_DP = A + (100H * B) + (100H * C) + (10000H * D)
```

SQUARE ROOT ROUTINE
--------------------

```
                    NO_ROTATE = 0

START:              IF P_DP > FFFFH
                    THEN P_DP = P_DP/4
                    NO_ROTATE = NO_ROTATE + 1
                    GOTO START
                    ELSE CONTINUE
                    ENDIF

IF FFFFH > P_DP > 3FFFH
                    THEN HGUESS = FFH
                         LGUESS = 80H
                    ENDIF

IF 3FFFH > P_DP > FFFH
                    THEN HGUESS = 80H
                         LGUESS = 40H
                    ENDIF

IF FFFH > P_DP > 3FFH
                    THEN HGUESS = 40H
                         LGUESS = 20H
                    ENDIF

IF 3FFH > P_DP > FFH
                    THEN HGUESS = 20H
                         LGUESS = 10H
                    ENDIF

IF FFH > P_DP > 3FH
                    THEN HGUESS = 10H
                         LGUESS = 8H
                    ENDIF

IF 3FH > P_DP > FH
                    THEN HGUESS = 8H
                         LGUESS = 4H
                    ENDIF

IF FH > P_DP > 3H
                    THEN HGUESS = 4H
                         LGUESS = 2H
                    ENDIF

IF 3H > P_DP
                    THEN HGUESS = 2H
                         LGUESS = 0H

SQRT:               NGUESS = (HGUESS + LGUESS)/2
                    NROOT = NGUESS * NGUESS
```

```
                        IF P_DP > NROOT
                        THEN HGUESS = NGUESS
                        ELSE LGUESS = NGUESS
                        ENDIF

IF -100H < (P_DP - NROOT) < 100H
                        THEN GOTO END1
                        ELSE GOTO SQRT
                        ENDIF

END1:                   IF NO_ROTATE = 0
                        THEN GOTO END2
                        ELSE CONTINUE
                        ENDIF

ADJUST = 1

LBLF:                   IF NO_ROTATE <> 0
                        THEN ADJUST = ADJUST * 2
                             NGUESS = NGUESS * 2
                             NO_ROTATE = NO_ROTATE - 1
                             GOTO LBLF
                        ELSE CONTINUE
                        ENDIF

S0:                     NROOT = NGUESS * NGUESS

IF P_DP - NROOT < 400H
                        THEN GOTO SQRT30
                        ELSE CONTINUE
                        ENDIF

IF P_DP - NROOT > 0
                        THEN NGUESS = NGUESS + ADJUST
                        ELSE NGUESS = NGUESS - ADJUST
                        ENDIF

IF ADJUST = 1
                        THEN GOTO SQRT30
                        ELSE ADJUST = ADJUST/2
                             GOTO S0
                        ENDIF

SQRT30:                 (P_DP)↑0.5 = NGUESS
                        GOTO SQRT31

END2:                   (P_DP)↑0.5 = NGUESS

SQRT31:                 NOP (P_DP)↑0.5 = (P_DP)↑0.5 * 800H
```

DIVIDE ROUTINE

```
              NO_LOOPS = FH
              NUM = (P_DP)↑0.5
              DIV = ROOT_T

IF ROOT_T AND 200H <> 0
              THEN IROTATE = 2
              ELSE IROTATE = 1
                   NO_LOOPS = NO_LOOPS + 1
              ENDIF

DIV1:         NUM = NUM * 2

IF IROTATE <> 1
              THEN IROTATE = IROTATE - 1
                   GOTO DIV1
              ELSE CONTINUE
              ENDIF

DIV3:         WSP = NUM/100H

IF WSP < DIV
              THEN NUM = NUM * 2
              ELSE NUM = NUM - (WSP * 100H) + 1
              ENDIF

IF NO_LOOPS = 1
              THEN GOTO ENDDIV
              ELSE NO_LOOPS = NO_LOOPS - 1
                   GOTO DIV3
              ENDIF

ENDDIV:       ROOT = NUM AND FFFH
```

LOOK-UP TABLE STRUCTURE FOR K(THETA, P)

TABLE 1

VALUES AT VARIOUS THETA GIVING:-

THETA = THROTTLE ANGLE

MIN_ROOT = MINIMUM VALUE OF ROOT HELD IN TABLE

MULT_FACTOR = MULTIPLICATION FACTOR FOR PARTICULAR THROTTLE ANGLE

GRAD0 = INTERPOLATION GRADIENT BETWEEN 0 AND MIN_ROOT

TABLE 2
-------

VALUES, AT VARIOUS THETA AS IN TABLE 1, FOR ROOT AT EQUAL SPACING BETWEEN MIN_ROOT AND THE MAXIMUM ROOT, AND FOR INTERPOLATION GRADIENTS BETWEEN ROOTS.

CALCULATE K(THETA, ROOT) ROUTINE
--------------------------------

```
          RROOT = ROOT/4

FIND FROM TABLE 1: THETA_A : THETA_A > THETA
                             THETA_B : THETA_B < THETA

FIND FROM TABLE 1: MIN_ROOT_A; MULT_FACTOR_A; GRAD0_A
                             MIN_ROOT_B; MULT_FACTOR_B; GRAD0_B

RROOT = RROOT - MIN_ROOT_A

IF RROOT < 0
          THEN GOTO K18
          ELSE CONTINUE
          ENDIF

BASE_A = (RROOT * MULT_FACTOR_A)/10000H
          INDEX_A = ((RROOT * MULT_FACTOR_A) AND FF00H)/100H

LOOK UP FROM TABLE 2: K_A; GRAD_A

K1 = K_A + (GRAD_A * INDEX_A)/100H

K3:       RROOT = RROOT - MIN_ROOT_B

IF RROOT < 0
          THEN GOTO K19
          ELSE CONTINUE
          ENDIF

BASE_B = (RROOT * MULT_FACTOR_B)/10000H
          INDEX_B = ((RROOT * MULT_FACTOR_B) AND FF00H)/100H

LOOK UP FROM TABLE 2: K_B; GRAD_B

K2 = K_B + (GRAD_B * INDEX_B)/100H
```

```
K5:        THETA_INDEX = (THETA-THETA_B)/(THETA_A-THETA_B)*100H

K(THETA,ROOT) = K2 + (THETA_INDEX * (K1-K2)/100H)

GOTO KEND

K18:       K1 = GRAD0_A * (RROOT + MIN_ROOT_A)

GOTO K3

K19:       K2 = GRAD0_B * (RROOT + MIN_ROOT_B)

GOTO K5

KEND:      NOP
```

FINAL MULTIPLY ROUTINE
----------------------

```
              K_M = (K(THETA,ROOT) AND FF00H)/100H
              K_L = K(THETA,ROOT) AND FFH
              ROOT_M = (ROOT AND FF00H)/100H
              ROOT_L = ROOT AND FFH

A = (K_L) * (ROOT_L)
              B = (K_L) * (ROOT_M) * 100H
              C = (K_M) * (ROOT_L) * 100H
              D = (K_M) * (ROOT_M) * 10000H

M = A + B + C + D
```

OUTPUT ROUTINE
--------------

```
              M = M/4000H

PORT 3 = M/100H

PORT 2 = M AND FFH
```

We claim:

1. An air mass flow measurement system into an internal combustion engine comprising an air intake throttle position transducer and futher transducers sensitive to ambient air pressure, ambient air temperature and the pressure downstream of the throttle and a calculating circuit connected to said transducers and arranged to execute the calculation $$\dot{M} = K\sqrt{\frac{P \cdot \Delta P}{T}}$$

where
- $\dot{M}$ is the air mass flow
- K is an orifice coefficient of discharge
- P is the ambient air pressure
- T is the ambient air temperature and
- $\Delta P$ is the pressure drop through the throttle, said calculating circuit including a digital memory containing empirically determined data representing the value of K for each combination of a plurality of different values of the throttle position and a plurality of different values of one or a combination of P, $\Delta P$ and T.

2. A measurement system as claimed in claim 1 in which the memory data represents the value of K for each combination of a plurality of different values of the throttle position and a plurality of different values of the expression $\sqrt{P \cdot \Delta P / T}$.

3. A measurement system as claimed in claim 1 or claim 2 including means for sampling the outputs of the transducers cyclically, the sampling interval for the ambient air pressure and ambient air temperature being longer than the sampling interval for the other variables.

* * * * *